(12) United States Patent
Stoneback (10) Patent No.: US 7,974,404 B2
(45) Date of Patent: Jul. 5, 2011

(54) PARALLEL SPLIT POWERING

(75) Inventor: Dean A. Stoneback, Souderton, PA (US)

(73) Assignee: General Instrument Corporation, Horsham, PA (US)

( * ) Notice: Subject to any disclaimer, the term of this patent is extended or adjusted under 35 U.S.C. 154(b) by 1128 days.

(21) Appl. No.: 11/614,259

(22) Filed: Dec. 21, 2006

(65) Prior Publication Data
US 2008/0152125 A1    Jun. 26, 2008

(51) Int. Cl.
*H04M 1/73* (2006.01)

(52) U.S. Cl. .......... 379/413.02; 379/413; 439/131; 475/215; 475/269; 477/2; 713/324

(58) Field of Classification Search .......... 342/357.02; 363/127; 365/229; 379/399.01, 413, 413.02; 429/23; 702/189; 713/300, 323, 324; 439/131; 475/215, 269; 477/2
See application file for complete search history.

(56) References Cited

U.S. PATENT DOCUMENTS

| | | | | |
|---|---|---|---|---|
| 5,204,963 A | * | 4/1993 | Noya et al. ............. | 365/229 |
| 5,708,820 A | * | 1/1998 | Park et al. ............. | 713/323 |
| 5,808,581 A | * | 9/1998 | Braisted et al. ........ | 342/357.02 |
| 5,846,155 A | * | 12/1998 | Taniguchi et al. ....... | 477/2 |
| 6,115,276 A | * | 9/2000 | Mao ................... | 363/127 |
| 6,125,448 A | * | 9/2000 | Schwan et al. ......... | 713/300 |
| 6,540,639 B1 | * | 4/2003 | Gumpoltsberger ....... | 475/215 |
| 6,596,948 B1 | * | 7/2003 | Haden et al. .......... | 174/262 |
| 6,607,464 B1 | * | 8/2003 | Bauer et al. .......... | 475/269 |
| 6,683,951 B1 | * | 1/2004 | Getchell ............. | 379/413.02 |
| 6,847,718 B1 | * | 1/2005 | Hiraoka .............. | 379/413 |
| 6,947,554 B2 | * | 9/2005 | Freyman et al. ........ | 379/413 |
| 6,956,943 B1 | * | 10/2005 | Goodrich, II et al. ... | 379/399.01 |
| 7,104,813 B1 | * | 9/2006 | Chuang ............... | 439/131 |
| 7,177,782 B2 | * | 2/2007 | Falik et al. .......... | 702/189 |
| 7,454,641 B2 | * | 11/2008 | Connor et al. ......... | 713/324 |
| 7,694,762 B2 | * | 4/2010 | Supina et al. ......... | 180/65.25 |
| 2004/0053093 A1 | * | 3/2004 | Colborn et al. ........ | 429/23 |
| 2007/0206780 A1 | * | 9/2007 | Kerry et al. .......... | 379/413.02 |
| 2008/0152125 A1 | * | 6/2008 | Stoneback ............ | 379/413 |

\* cited by examiner

*Primary Examiner* — Gerald Gauthier
(74) *Attorney, Agent, or Firm* — Larry T. Cullen (57) ABSTRACT

A system for providing power to a network interface device (NID) includes a primary power supply device (PPSD), a battery backup device (BBD), and an electrical bus connecting the PPSD, the BBD, and the NID in parallel. The PPSD is operable to power the NID. The BBD is configured to provide power to the NID in response to a power loss event, such as the PPSD failing to provide adequate power to the NID.

24 Claims, 5 Drawing Sheets

PARALLEL SPLIT POWERING

BACKGROUND

Network interface devices (NIDs) are becoming increasingly popular in both residential and commercial applications. NIDs are electronic units used as an interface for providing telephone, media, and/or data services to a user. NIDs can be passive or active. Passive NIDs are generally used as a point of demarcation between a network provider's infrastructure and a home owner's wiring (for example, the telephone NID on the side of the typical home). Active NIDs contain electronic components which convert and/or process signals. For instance, NIDs include residential gateways, which are devices for receiving external telephone, media, and/or data services from providers. NIDs may, for example, receive fiber-to-home or fiber-to-curb connections and convert the signals sent by providers over these connections into a format, which can be utilized by a user device. A user device may include cable modems, set top boxes (STB), telephones, etc.

Powering NIDs, however, is problematic, because service providers generally prefer to place NIDs on the exterior of a building. This allows the service provider access to the NID without requiring access to the inside of the dwelling, but disfavored because placement of NIDs outdoors limits their access to electrical outlets. Even when NIDs are installed inside a building, they are often placed in remote locations, away from electrical outlets, due to the aesthetic concerns. Therefore, the placement of NIDs may often require the installation of wiring and electrical outlets, which is a time-consuming and expensive process.

The need to provide a battery back-up for NIDs further exacerbates the problem of powering NIDs. The battery back-up devices used to power NIDs in the event of a power failure are often large boxes, which provide further aesthetic disadvantages when placed inside a building. However, battery back-up devices cannot be efficiently placed outside a building in most locations because battery capacity and life are significantly affected by year round temperature fluctuations.

Figure 1:
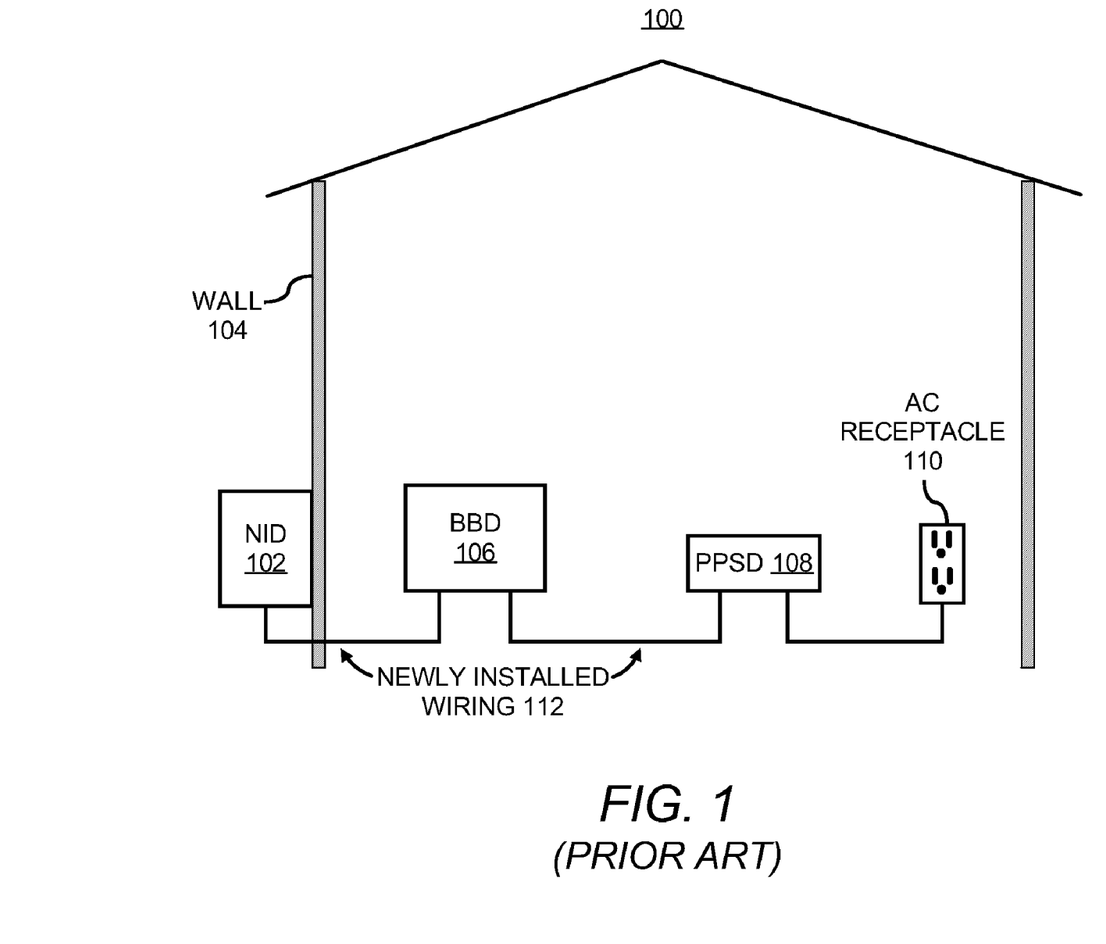
FIG. 1 illustrates a prior art system of powering a NID.

FIG. 1 depicts a prior art system 100 for powering a NID. The system 100 depicts a NID 102 located on the exterior of a wall 104 of a residential home. The NID 102 requires electrical power to operate, but there are no electrical outlets on the outside of the home within range of the NID 102. Therefore, the NID 102 must receive electrical power from an AC receptacle 110 located inside the home.

A primary power supply device (PPSD) 108 is connected to the AC receptacle 110. The PPSD 108 is a device operable to supply a DC current that may be used by the NID 102 as supplied power. The PPSD 108 receives an AC current from an AC source, such as the AC receptacle 110, and converts the AC to DC. The PPSD 108 may be plugged into the AC receptacle 110. The PPSD 108 also transmits the DC to a battery back-up device (BBD) 106. The BBD 106 transmits the DC power from the PPS 108 to the NID 102, during normal operating conditions, to thereby power the NID 102. The BBD 106 is a device containing a battery, which is operable to supply power to the NID 102 if the PPS 108 fails to provide a predetermined amount of power. For example, if the voltage received from the PPSD 108 drops below a certain level, the BBD 106 may provide power to the NID 102.

In the system 100, the NID 102, the BBD 106, and the PPSD 108 are connected in series, such that current flows in a single path through all the components. Typically, connecting the components in series requires installing newly installed wiring 112, because pre-existing wires are not of sufficient gauge to carry the required current to power the new equipment and/or are not present in a structure to connect a plurality of components in series. The newly installed wiring 112 may be installed in the walls or under the flooring of the structure having the NID 102; otherwise the newly installed wiring 112 must be left exposed. However, both possibilities are disfavored, because installing wiring is time-consuming and expensive and leaving the newly installed wiring 112 exposed may be aesthetically displeasing.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

According to an embodiment, a method and system described herein allows for both a primary power supply device (PPSD) and battery back-up device (BBD) to deliver power to a telecommunications interface device (NID) via an electrical bus connecting the PPSD, BBD, and NID in parallel. When the PPSD fails, the BBD supplies power to the NID over the electrical bus connecting the components in parallel. The electrical bus may include existing wiring, such as 24 gauge telephone wiring that has been previously installed in a structure, such as a residential home or commercial building. In addition, connecting the NID to the electrical bus in parallel allows the PPSD and BBD to physically be placed anywhere, inside or outside of the structure, so long as they are connected to the electrical bus.

A NID may be any hardware, software, or combination of hardware and software capable of receiving signals from a service provider and rendering those signals suitable for a user device. For example, NIDs may receive signals and/or physical wiring carrying signals from telephone service providers, internet providers, media providers, etc. Generally, service providers transmit a complex digital signal over fiber, copper, DSL, etc., to the NID. User devices cannot effectively interpret this complex signal. Thus, the NID may convert these complex digital signals into a format that a user device may utilize. A user device may include a telephone, a set-top-box, a router, etc, which receives signals and provides services to the user. The NID may contain any appropriate outputs, such as telephone jacks, cable ports, Ethernet ports, etc. Therefore, the NID acts as an interface between service providers and a user device.

For instance, a NID may be a device, such as a residential gateway, which is configured to receive telephone, cable television, Internet services, etc., from various service providers. Residential gateways are well known in the art and may include, for example, service gateway units, Moving Picture Experts Group (MPEG) decoders, National Television System Committee (NTSC) video interfaces, telephone interfaces and Ethernet data interfaces. A residential gateway may contain the necessary hardware and software for interfacing with the various service providers and for driving the services into a structure, such as residential home.

NIDs may be located inside a structure, such as user's home or a commercial building. For example, NIDs may be placed in the basement of a residence or in a designated utility closet of a commercial building. NIDs may also be placed on the exterior of a structure. For example, a NID may be placed on an outside wall of a user's home or business.

Figure 2A:
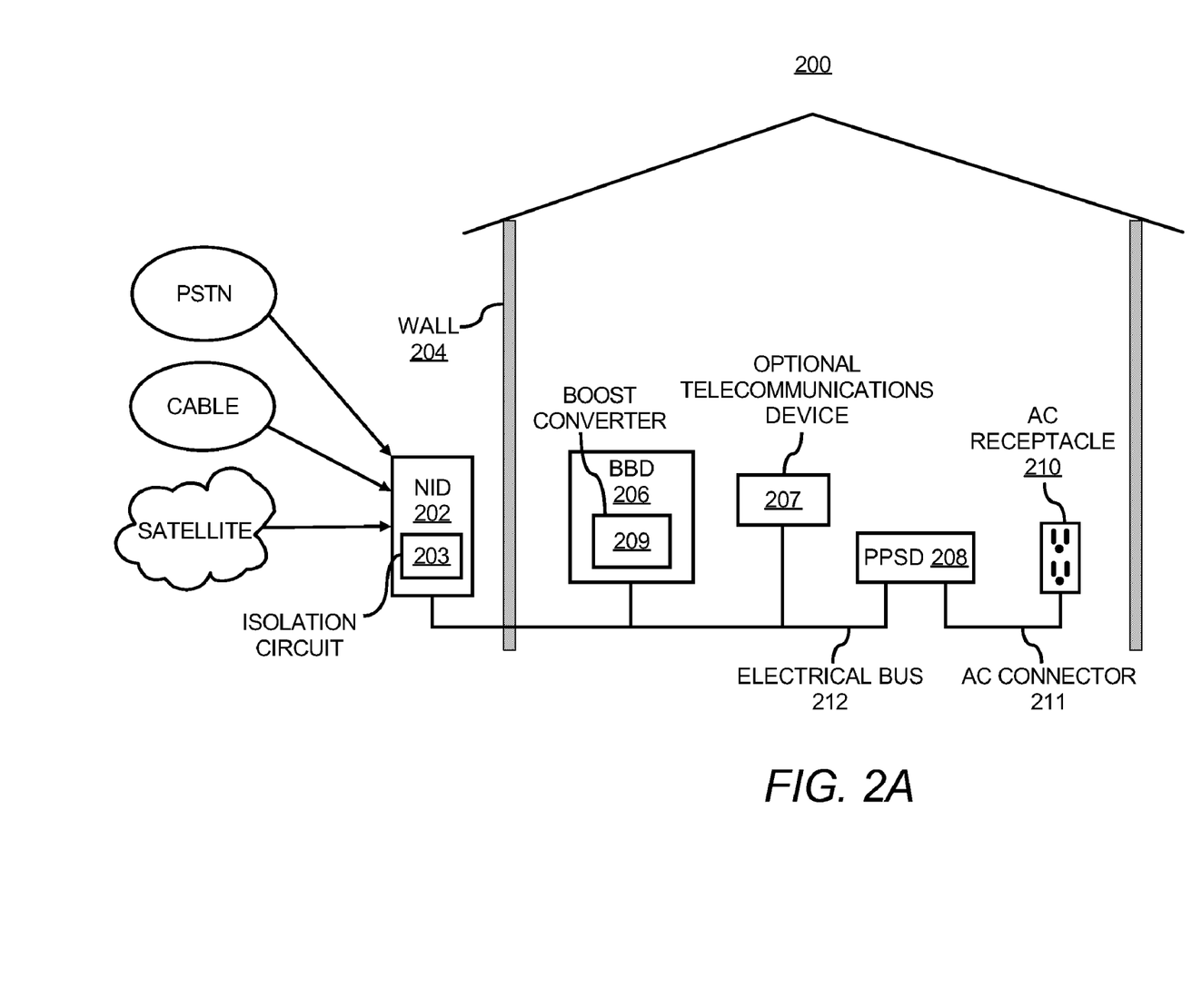
FIG. 2A illustrates a system of powering a telecommunications device with a battery backup device (BBD) and a primary power supply device (PPSD) connected in parallel via an electrical bus, according to an embodiment.

FIG. 2A illustrates a system 200 for powering a NID 202, according to an embodiment. The system 200 includes a NID 202, a BBD 206, an optional telecommunications device 207, a PPSD 208, and an AC receptacle 210. As set forth above, the NID 202 may be any hardware, software, or combination of hardware and software capable of receiving and sending signals from and to a service provider and rendering those signals suitable for a user device. For example, FIG. 2A depicts the NID 202 receiving services from the Public Switched Telephone (PSTN) Network, a Hybrid Fiber-Coax (HFC) Cable Network, and a satellite. However, a person having ordinary skill in the art will appreciate that the NID 202 may receive signals from any number of service providers, including but not limited to those depicted in FIG. 2A.

FIG. 2A depicts the NID 202 disposed on the exterior of a wall 204. For example, the NID 202 may be a box attached to the outside of a user's home. However, the NID 202 may also be located on the interior of the structure. For instance, the NID 202 may be placed in a user's basement.

The NID 202, the BBD 206, and the PPSD 208 are connected in parallel by an electrical bus 212. The electrical bus 212 may include any device capable of carrying an electric current between multiple devices. The electrical bus 212 is used to carry a current, such as a low voltage DC, to power to NID 202. A person having ordinary skill in the art will appreciate that while a low voltage current, such as a 48 volt current may be carried by the electrical bus 212, other voltages may also be used. For example, the electrical bus 212 may include wires or cables, such as a twisted pair or coaxial cable. The electrical bus 212 may include wire of any size and may, for instance, include pre-installed wiring, such as pre-installed 24 gauge telephone wiring. Pre-installed wiring refers to wiring that has been installed prior to the installation of the NID 202. For example, pre-installed wiring may include wiring installed during the initial construction of the structure or installed after the initial construction of the structure, during a renovation for instance, but before the installation of the NID 202. Therefore, the electrical bus 212 may include standard 24 gauge telephone wiring installed throughout a structure.

The term connected in parallel means that current may flow through more than one path. That is, current flowing through the electrical bus 212 may flow in one path to the NID 202 and in one path to the BBD 206. Additionally, because the components are connected in parallel, virtually any number of different components may be connected to the electrical bus 212 to receive and/or provide power. Therefore, if the electrical bus 212 includes pre-installed 24 gauge telephone wiring, any device may be connected to the electrical bus 212 via standard, pre-installed telephone jacks located throughout the structure.

FIG. 2A depicts the PPSD 208 receiving AC from the AC receptacle 210 via an AC connector 211. For instance, the PPSD 208 may be a device, which is plugged into the AC receptacle 210 and, therefore, the AC connector 211 may include a plug. In another embodiment, the PPSD 208 may be directly wired to an AC source. In any event, the PPSD 208 may receive the AC and convert the AC into DC, as set forth above. While FIG. 2A depicts a single PPSD 208, a person having ordinary skill in the art will appreciate that the system 200 may include multiple PPSDs 208 on the electrical bus 212 to allow for redundant powering from multiple AC sources. The DC may be output from the PPSD 208 to the electrical bus 212, where it may flow to the NID 202, to provide power to the NID 202.

As FIG. 2A depicts, the BBD 206 is also connected to the electrical bus 212. The BBD 206 may supply a low-voltage DC to power the electrical bus 212 and, accordingly, the devices drawing power from the electrical bus 212, such as the NID 202, from a battery contained in the BBD 206. While FIG. 2A depicts a single BBD 206, a person having ordinary skill in the art will appreciate that the system 200 may include multiple BBDs 206 on the electrical bus 212 to allow for redundant powering from multiple battery sources. The BBD 206 may begin to supply DC to the NID 202 in response to a power loss event. A power loss event may be detected when the voltage on the electrical bus 212 drops below a predetermined threshold A power loss event may trigger the BBD 206 to output electricity. The power loss event may include the PPSD 208 failing to provide a predetermined amount of power. For example, the voltage on the electrical bus 212 dropping below a predetermined threshold, such as 40 volts (V) may constitute a power loss event, which automatically triggers the BBD 206 to supply power to the NID 202 via the electrical bus 212.

A power loss event, which triggers the BBD 206 to supply power to the NID 202, may be detected by a user or any device connected to the electrical bus 212, such as the BBD 206 itself. For example, the BBD 206 may monitor the voltage on the electrical bus 212 to determine when a power loss event has occurred. In another embodiment, the NID 202 may detect a power loss event or a power loss event may be detected by another device in connection with the electrical bus 212.

A power loss event may also be detected by other means, such as communication from the NID 202 or the PPSD 208. For instance, the NID 202 or the PPSD 208 may signal the BBD 206 to cause the BBD 206 to begin supplying backup power. The signal may include an indication of a voltage drop on the electrical bus 212, an indication that the NID 202 is not receiving sufficient power, or an indication that the PPSD 208 is unable to provide sufficient power.

Figure 2B:
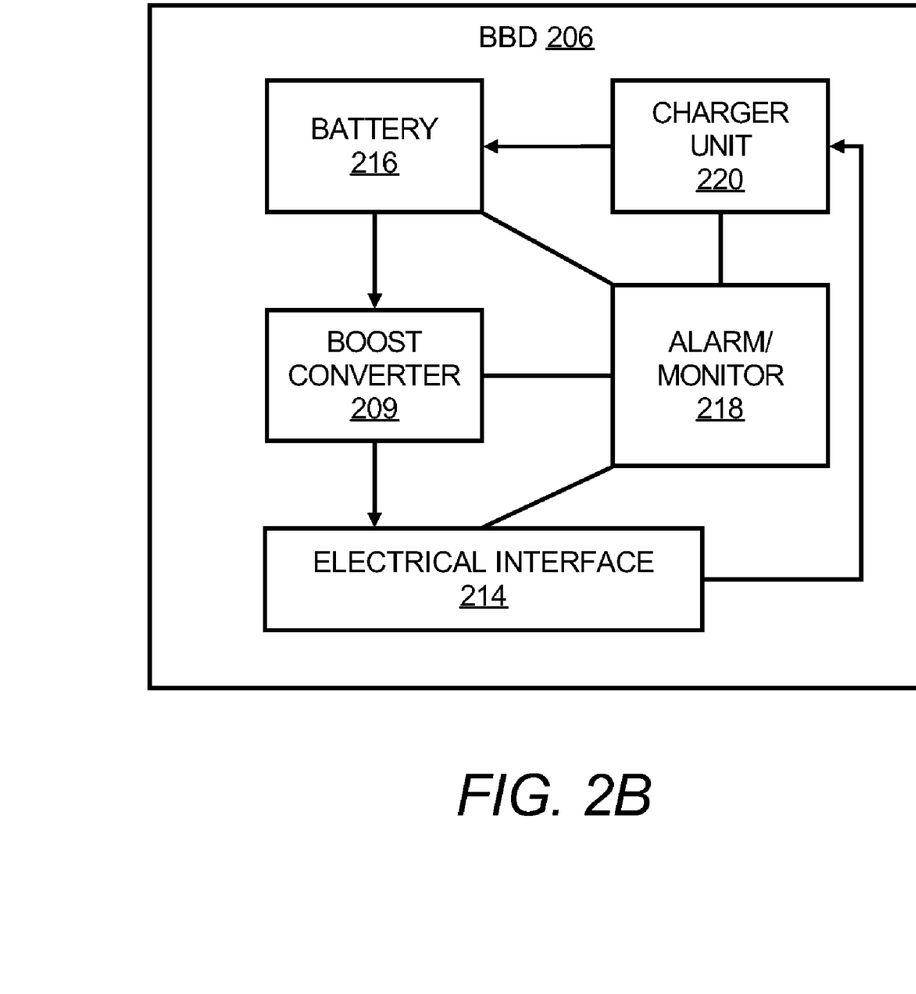
FIG. 2B illustrates a block diagram of the BBD, according to an embodiment.

FIG. 2B depicts a block diagram of the BBD 206, according to an embodiment. The BBD 206 includes an electrical interface 214, which connects the BBD 206 to the electrical bus 212. The electrical interface 214 may include, for example, a standard telephone jack or outlet to interface with 24 gauge telephone wiring of a plain old telephone system (POTS). The BBD 206 also includes an alarm/monitor 218, which monitors the voltage on the electrical bus 212. The alarm/monitor 218 may determine if the voltage on the electrical bus 212 drops below a predetermined threshold. Therefore, the alarm/monitor 218 may include electrical devices and circuitry for measuring properties of an electric current, such as voltage. The alarm/monitor 218 may also communicate with the NID 202 or the PPSD 208 via radio frequency (RF) signals or other means to share information on the status of the system 200. The alarm/monitor 218 may determine that the voltage on the electrical bus 212 is above a predetermined threshold and instruct a charger unit 220 to charge the battery 216. For instance, the alarm/monitor 218 may instruct the charger unit 220 to charge the battery 216 when the PPSD 208 is functioning properly and supplying enough voltage to the power the NID 202 and to charge the battery 220 in the BBD 206. The battery 216 may be any size or type of electrochemical device which stores energy. The battery 216 may include any battery known in the art including, for example, a standard 12V DC battery.

If the alarm/monitor 218 determines that the voltage on the electrical bus 212 falls below a predetermined threshold, the alarm/monitor 218 may instruct the battery 216 to begin supplying power to the electrical bus 212. The power from the battery 216 may flow through a boost converter 209 and through the electrical interface 214 to the electrical bus 212. The boost converter 209 is capable of receiving a current and outputting the current at a higher voltage than the voltage of the current that is input into the boost converter 209. For example, the boost converter 209 may receive the relatively low voltage DC produced by a 12V battery and boost the voltage to a 40V range, because the NID 202 may require a 48V electric current to power the NID 202. Relatively higher voltages, such as the 48 volts used in this example, are often advantageous when using existing wiring, which is only capable of carrying the low currents associated with high voltages. However, while 48 volts is used in this example, a person having ordinary skill in the art will appreciate that the system 200 could be used with any reasonably suitable voltage range.

The alarm/monitor 218 may also be capable of sending a signal to alert a user that the voltage on the electrical bus 212 has dropped below a predetermined threshold. The signal may include an electronic signal sent over the electrical bus 212 via the electrical interface 214. The signal may also include a visual or auditory indicator associated with the alarm/monitor 218. For example, the signal may include a simple light emitting diode (LED) or a speaker, which functions to alert a user that the voltage on the electrical bus 212 has dropped below a predetermined threshold. The alarm/monitor 218 may also include a more complex display device, such as a liquid crystal display (LCD) screen to provide more detailed signals to a user. For example, an LCD screen on the BBD 206 may provide a user with the measurements of the voltage on the electrical bus 212 or an estimate of remaining battery life or charge status.

Because the components of the system 200 are connected via the electrical bus 212, the BBD 206 and the PPSD 208 may be "split" from each other. That is, the BBD 206 and the PPSD 208 may be located in two separate physical locations. In fact, the BBD 206 may be connected anywhere on the electrical bus 212.

The system 200 depicted in FIG. 2 also includes an optional telecommunications device 207. The optional telecommunications device 207 may be any device, such as the user device described above with respect to the NID, which is connected to the electrical bus 212. For example, the optional telecommunications device 207 may be a telephone, videophone, router, set-top-box, computer, etc, which draws power from the electrical bus 212. While FIG. 2 depicts a single optional telecommunications device 207, the system 200 may not include the optional telecommunications device 207 or may include any number of optional telecommunications devices.

The NID 202 may include an isolation circuit 203. The isolation circuit 203 restricts electric current from flowing in a direction and may include, for example, a diode circuit. The isolation circuit 203 may be used to prevent current from leaving the NID 202 and flowing back into the electrical bus 212. The isolation circuit 203 may be particularly beneficial if the PPSD 208 fails rapidly. If the PPSD 208 were to suddenly fail, the voltage on the electrical bus 212 would also fall suddenly. This would result in a sudden voltage loss in the NID 202. Isolating the voltage allows the BBD 206 to detect the voltage drop associated with this power loss event and immediately begin supplying power to the NID 202 to compensate for the failure of the PPSD 208. However, it may take several milliseconds or multiple seconds for the BBD 206 to restore voltage to the electrical bus 212. In this relatively short amount of time the NID 202 may lose too much voltage to continue functioning. Therefore, the isolation circuit 203 may maintain the voltage in the NID 202 at a level sufficient to keep the NID 202 functioning, while the BBD 206 engages. The isolation circuit 203 also allows the voltage on the electrical bus 212 to drop, signaling the BBD 206 to engage, while maintaining sufficient voltage inside the NID 202 during the transition period.

As set forth above, the electrical bus 212 may carry an electric current to power the NID 202. However, the electrical bus 212 may also carry communication signals. Communication signals may include any type of data carried over the electrical bus 212 between any components connected to the electrical bus 212. For example, the electrical bus 212 may carry audio, video, and/or textual data from the NID 202 to the optional telecommunications device 207. The communication signals may be used to signal the health and condition of the powering system. For instance, examples of communication signals may include messages such as, "battery present," "battery OK," "state of battery charge or discharge," "availability of AC main power," "present power demand of NID," etc. The electrical bus 212 may facilitate the transmission of communications signals in a manner similar to the signaling path described in U.S. Pat. No. 6,449,263, entitled "Method for Communicating Signaling Messages Through a Broadband Network, filed Mar. 2, 1998, by Harris et al., which is hereby incorporated by reference in its entirety.

Figure 3:
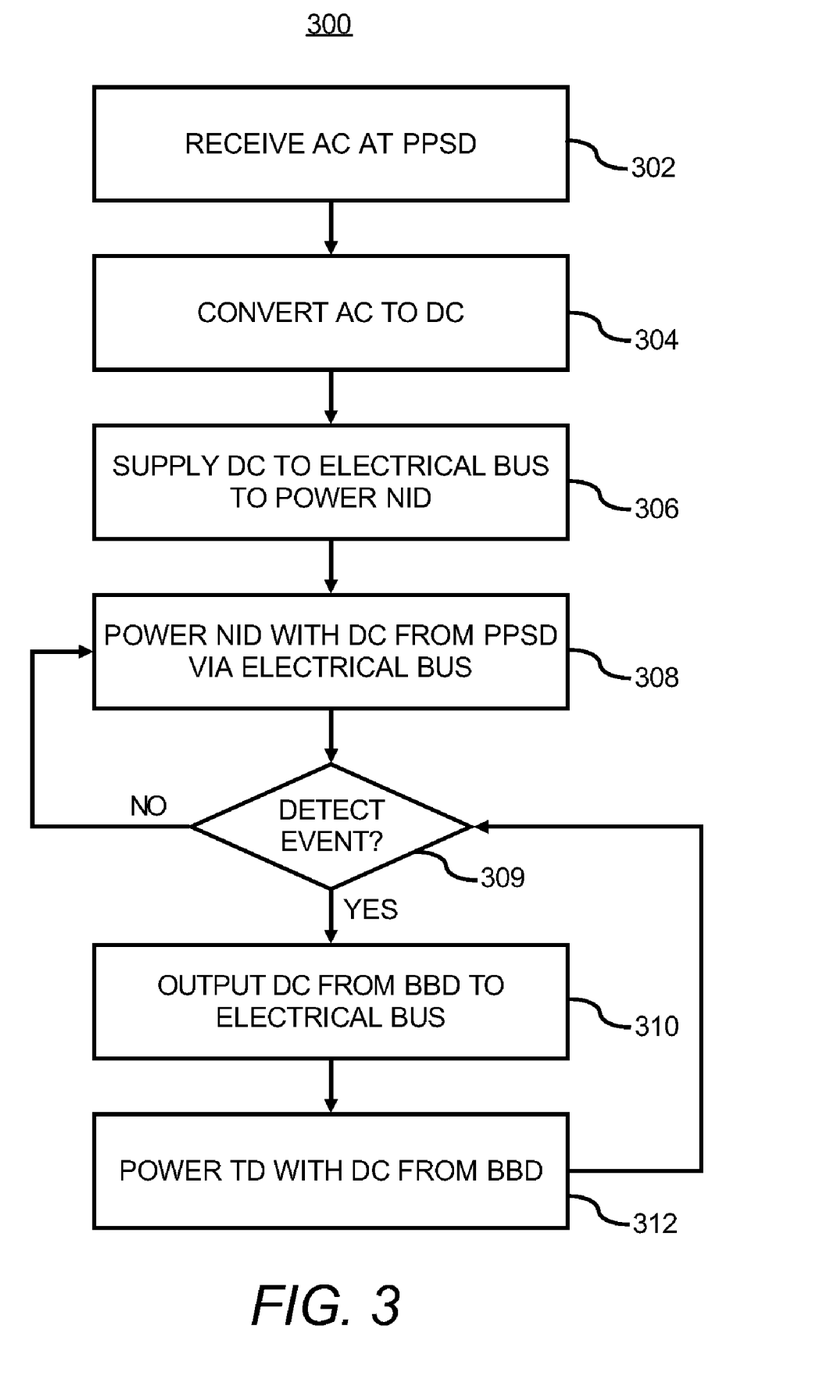
FIG. 3 illustrates a flow chart of a method for powering a NID with a BBD and a PPSD connected in parallel, according to an embodiment.

FIG. 3 depicts a flow chart of an illustrative method 300 for powering a NID with a PPSD and a BBD connected in parallel via an electrical buss. The method 300 is described with respect to the FIG. 2 by way of example and not limitation and it will be apparent that the method 300 may be used in other systems. Moreover, it will also be apparent to a person having ordinary skill in the art that certain steps in the method 300 are optional and in particular the NID may be powered without practicing certain steps illustrated in FIG. 3. Similarly, additional steps may be inherent or added to the method 300.

At step 302, AC is received at the PPSD 208. For instance, the PPSD 208 may recover the AC from the AC receptacle 210.

At step 304, the AC received at the PPSD 208 is converted into DC by the PPSD 208. The AC is converted into DC to allow the DC to power the NID 202, the optional telecommunications device 207, and any other devices connected to the electrical bus 212. The DC may also be used to charge the battery in the BBD 206.

At step 306, the DC converted from the AC by the PPSD 208 is supplied to the electrical bus 212 to power the PPSD 208. The DC may carried over conventional pre-installed 24 gauge telephone wiring.

At step 308, the NID 202 is powered with the DC supplied by the PPSD 208. Step 308 may also include powering the optional telecommunications device 207 and charging the battery of the BBD 206 with the DC output from the PPSD 208.

At step 309, a determination is made as to whether a power loss event is detected. For example, an event may include the voltage on the electrical bus 212 dropping below a predetermined threshold and may be detected by the BBD 206. If a power loss event is not detected, the method 300 may repeat back to step 308. However, if a power loss event is detected, the method 300 may continue to step 310.

At step 310, DC may be supplied by the BBD 206 to the electrical bus 212. Step 310 may also include boosting the voltage supplied from a battery in the BBD 206 by the boost converter 209.

At step 312, the NID 202 is powered by the DC supplied by the BBD 206. In this manner, the NID 202 is provided with a backup power supply in case the PPSD 208 fails. In the event the PPSD 208 begins to output DC or the voltage on the electrical bus 212 increases above a predetermined threshold, the BBD 206 may cease outputting DC and the method 300 may continue back to step 309 until a power loss event is again detected.

Figure 4:
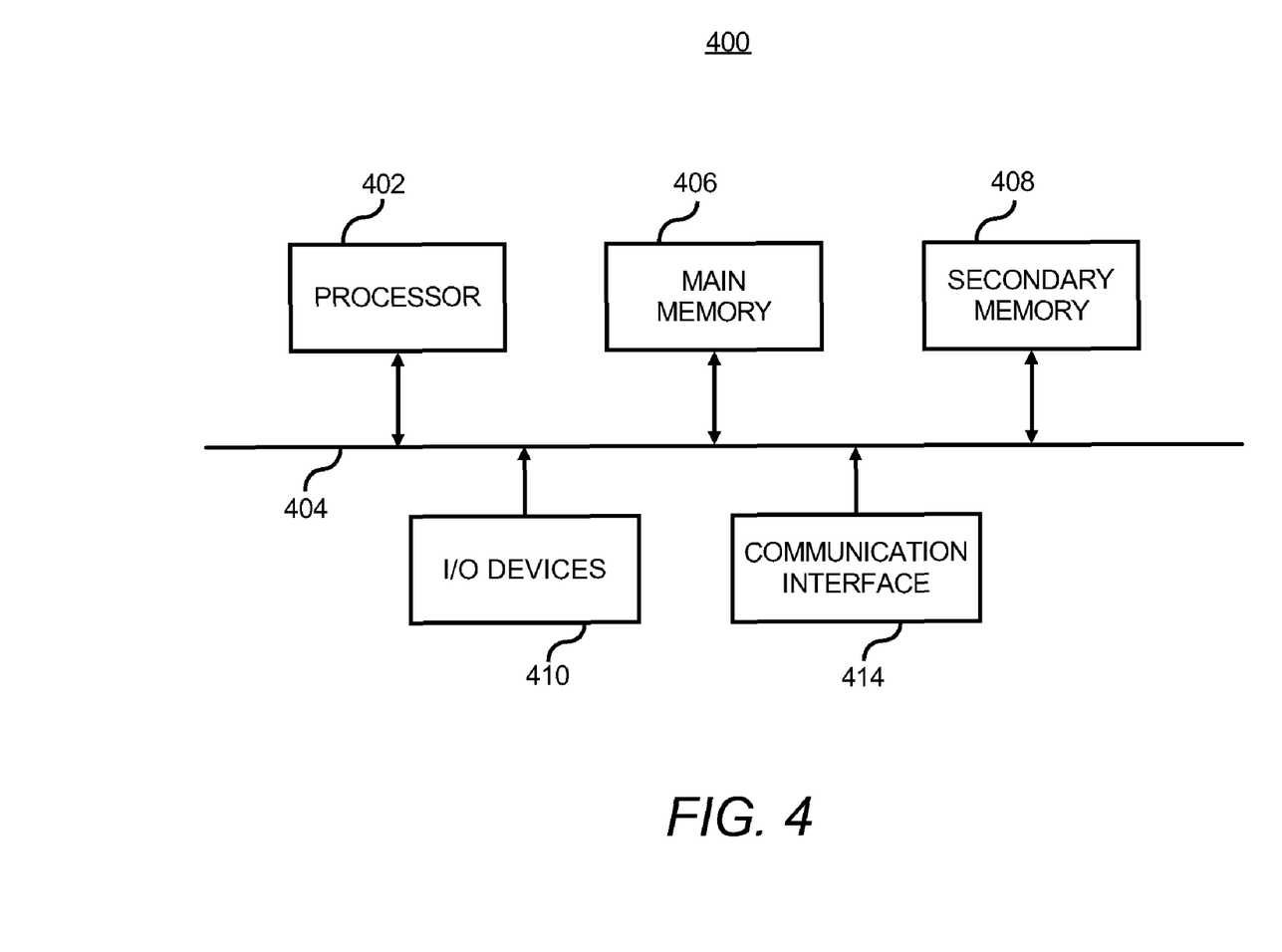
FIG. 4 illustrates a block diagram of a computing platform, according to an embodiment.

FIG. 4 illustrates a block diagram of a general purpose computer system 400 that is operable to be used as a platform for the components of the system 200 described above. The general purpose computer system 400 may be used as, or may comprise a part of the PPSD 208, the BBD 206, the optional telecommunications device 207, or the NID 202. For example, the general purpose computer system 400 may represent components of the alarm/monitor 218, illustrated in FIG. 2B. Furthermore, components may be added or removed from the general purpose computer system 400 to provide the desired functionality.

The computer system 400 includes processor 402, providing an execution platform for executing software. Commands and data from the processor 402 are communicated over a communication bus 404. The computer system 400 also includes a main memory 406, such as a Random Access Memory (RAM), where software may reside during runtime, and a secondary memory 408. The secondary memory 408 includes, for example, a hard disk drive and/or a removable storage drive representing a floppy diskette drive, a magnetic tape drive, a compact disk drive, etc., or a nonvolatile memory where a copy of the software is stored. In one example, the secondary memory 408 also includes ROM (read only memory), EPROM (erasable, programmable ROM), EEPROM (electrically erasable, programmable ROM). The computer system 400 includes I/O devices 410. The I/O devices may include a display and/or user interfaces comprising one or more I/O devices 410, such as a keyboard, a mouse, a stylus, and the like. However, the I/O devices 410 are optional as well as other shown components. A communication interface 414 is provided for communicating with other computer systems. The communications interface 414 may facilitate connection to a network.

One or more of the steps described herein are operable to be implemented as software stored on a computer readable medium, such as the memory 406 and/or 408, and executed on the computer system 400, for example, by the processor 402.

The steps are operable to be embodied by a computer program, which can exist in a variety of forms both active and inactive. For example, they exist as software program(s) comprised of program instructions in source code, object code, executable code or other formats for performing some of the steps. The codes described above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A system for powering a network interface device (NID) comprising:
    a primary power supply device (PPSD), wherein the PPSD is operable to receive an alternating current (AC) from an AC receptacle and convert the AC into direct current (DC) to supply power to the NID;
    a battery backup device (BBD), wherein the BBD includes a battery and is configured to provide power to the NID in response to a power loss event; and
    an electrical bus connecting the PPSD, the BBD, and the NID in parallel, wherein the power from the PPSD is supplied to the NID and the BBD in parallel via the electrical bus,
    wherein the NID is operable to receive signals from a service provider and convert the signals received from the service provider into a format used by a user device; wherein the user device is operable to receive communication signals from the NID.

2. The system of claim 1, wherein the electrical bus includes 24 gauge wire connecting the PPSD, the BBD, and the NID in parallel.

3. The system of claim 1, wherein the electrical bus includes pre-installed telephone wiring connecting the PPSD, the BBD, and the NID in parallel.

4. The system of claim 1, wherein the electrical bus facilitates both the powering of the NID and the transmission of communication signals to and/or from the NID.

5. The system of claim 1, wherein the NID is located outside a structure and the user device is located inside the structure.

6. The system of claim 1, wherein the NID is operable to receive power from both the PPSD and the BBD.

7. The system of claim 1, further comprising:
an optional telecommunications device connected to the electrical bus, wherein the optional telecommunications device is powered by current received from the electrical bus.

8. The system of claim 6, wherein the electrical bus is operable to transmit communication signals to and/or from a user device.

9. The system of claim 1, wherein the power loss event includes the voltage on the electrical bus falling below a predetermined threshold voltage.

10. The system of claim 1, wherein the BBD includes a boost converter for boosting the voltage of the electric current supplied from the battery of the BBD.

11. The system of claim 1, wherein the NID includes an isolation circuit inhibiting a voltage drop in the NID in response to a rapid voltage drop in the electrical bus.

12. The system of claim 1, further comprising:
multiple PPSDs, wherein each PPSD is connected in parallel to the NID and BBD via the electrical bus.

13. The system of claim 1, further comprising:
multiple BBDs, wherein each BBD is connected in parallel to the NID and PPSD via the electrical bus.

14. A method for providing power to a network interface device (NID), wherein the NID, a battery backup device (BBD), and a primary power supply device (PPSD) are connected in parallel via an electrical bus, the method comprising:
supplying current from the PPSD to the electrical bus the PPSD being operable to receive an alternating current (AC) and convert the AC into direct current (DC);
powering the NID with the current supplied from the PPSD via the electrical bus; and
outputting current from the BBD to the electrical bus in response to a detection of a power loss event, wherein the NID, the PPSD, and the BBD are connected in parallel by an electrical bus,
wherein the NID is operable to receive signals from a service provider and convert the signals received from the service provider into a format used by a user device;
wherein the user device is operable to receive communication signals from the NID.

15. The method of claim 14, wherein outputting current from the BBD to the electrical bus in response to a detection of a power loss event further comprises:
detecting a voltage drop below a predetermined threshold on the electrical bus.

16. The method of claim 14, wherein outputting current from the BBD to the electrical bus in response to a detection of a power loss event further comprises:
receiving a signal at the BBD, wherein the signal informs the BBD that the PPSD is not supplying a sufficient level of power.

17. The method of claim 14, wherein outputting current from the BBD to the electrical bus in response to a detection of a power loss event further comprises:
boosting the voltage of a current supplied by a battery in the BBD.

18. The method of claim 14 further comprising:
impeding a voltage drop at the NID with an isolation circuit; and
powering the NID with the current supplied from the BBD.

19. The method of claim 14, further comprising:
receiving alternating current (AC) at the PPSD; and
converting the AC into direct current (DC) by the PPSD.

20. A parallel split powering architecture comprising:
a network interface device (NID), wherein the NID is operable to receive signals from a service provider and convert the signals received from the service provider into a format used by a user device;
the user device located in an interior of the residential structure, wherein the user device is operable to receive communication signals from the NID;
a primary power supply device (PPSD), wherein the PPSD is operable to receive an alternating current (AC) from an AC receptacle and convert the AC into direct current (DC) to power the NID;
a battery backup device (BBD), wherein the BBD includes a battery and is configured to provide power to the NID in response to a power loss event; and
an electrical bus connecting the PPSD, the BBD, and the NID in parallel, wherein the electrical bus provides current to power the NID.

21. The parallel split powering architecture of claim 20, wherein the BBD includes a charger for charging the battery in the BBD from the DC supplied from the PPSD carried by the electrical bus.

22. The parallel split powering architecture of claim 20, wherein the BBD includes a boost converter for boosting the voltage provided by a low voltage battery in response to a voltage on the electrical bus falling below a predetermined threshold.

23. The parallel split powering architecture of claim 20, wherein the NID includes a isolation circuit for impeding a voltage drop in the NID while allowing a rapid voltage drop in the electrical bus.

24. The parallel split powering architecture of claim 20, wherein the electrical bus facilitates the transmission of communication signals.

* * * * *